United States Patent [19]

Hamada et al.

[11] Patent Number: 5,492,969
[45] Date of Patent: Feb. 20, 1996

[54] CURABLE ORGANOPOLYSILOXANE COMPOSITION

[75] Inventors: Yuji Hamada; Hideki Kobayashi, both of Chiba Prefecture, Japan

[73] Assignee: Dow Corning Toray Silicone Co., Ltd., Tokyo, Japan

[21] Appl. No.: 339,099

[22] Filed: Nov. 14, 1994

[30] Foreign Application Priority Data

Nov. 25, 1993 [JP] Japan ................................. 5-321024

[51] Int. Cl.$^6$ ................................................. C08L 83/08
[52] U.S. Cl. ................................. 525/104; 524/506
[58] Field of Search .................... 525/102, 104; 524/506

[56] References Cited

U.S. PATENT DOCUMENTS

| | | | |
|---|---|---|---|
| 4,028,431 | 6/1977 | Futami et al. | 525/104 |
| 4,314,043 | 2/1982 | Kojima et al. | 525/102 |
| 4,736,048 | 4/1988 | Brown et al. | 556/454 |
| 5,010,137 | 4/1991 | Umeda et al. | 525/104 |
| 5,132,366 | 7/1992 | Kashida | 525/102 |

FOREIGN PATENT DOCUMENTS

| | | |
|---|---|---|
| 370689 | 5/1990 | European Pat. Off. . |
| 487079 | 5/1992 | European Pat. Off. . |
| 48901 | 5/1988 | Japan . |
| 6145527 | 5/1994 | Japan . |

*Primary Examiner*—Ralph H. Dean
*Attorney, Agent, or Firm*—Alexander Weitz

[57] ABSTRACT

There is disclosed a composition which can cure to provide a coating showing excellent release against tacky substances, particularly silicone pressure-sensitive adhesive, said composition comprising:

(A) 100 parts by weight of an organopolysiloxane that contains at least one fluorinated organic group and at least two alkenyl groups in each molecule;

(B) 0.3 to 40 parts by weight of an organohydrogenpolysiloxane that contains at least two silicon-bonded hydrogen atoms in each molecule;

(C) 0.1 to 20 parts by weight of a fluorine-containing acrylic polymer;

(D) a catalytic quantity of a hydrosilylation catalyst; and (E) a sufficient amount of an organic solvent to impart coatability to said composition.

19 Claims, No Drawings

CURABLE ORGANOPOLYSILOXANE COMPOSITION

FIELD OF THE INVENTION

The invention relates to a curable organopolysiloxane composition. More specifically, the invention relates to an organopolysiloxane composition that forms cured release coatings that exhibit excellent release properties relative to silicone-based tacky substances.

BACKGROUND OF THE INVENTION

It has long been known that products capable of releasing tacky substances (e.g., pressure-sensitive adhesives) can be prepared by forming a cured release coating on the surface of many different types of substrates, such as paper, plastic films, synthetic fiber fabrics, and so forth. Organopolysiloxane compositions are typically used to form these cured release coatings. Thus, for example, Japanese Patent Publication Number Sho 63-48901 teaches an organopolysiloxane composition of vinyl-containing organopolysiloxane, SiH-containing organohydrogenpolysiloxane, a perfluoroalkyl-containing compound, and a platinum compound. Japanese Patent Application Laid Open Number Sho 63-320 discloses an organopolysiloxane composition composed of organopolysiloxane that contains both vinyl and fluoroalkyl groups, organohydrogenpolysiloxane, and a platinum compound.

The cured films obtained from the aforementioned organopolysiloxane compositions do in fact exhibit excellent release properties with respect to tacky substances based on ordinary organic resins. However, they exhibit poor release properties when challenged by silicone-based tacky materials, whose main component is organopolysiloxane, and as a consequence they are not completely satisfactory for some applications.

SUMMARY OF THE INVENTION

It has now been discovered that an organopolysiloxane composition containing a specific type of organic resin yields a cured coating that exhibits excellent release properties relative to silicone-based pressure-sensitive adhesives. The invention was developed based on this discovery.

The invention takes as its object the introduction of an organopolysiloxane composition that cures into a release coating that exhibits excellent release properties with respect to various types of tacky substances and particularly silicone-based tacky substances.

The invention therefore relates to a curable organopolysiloxane composition that is composed of (A) 100 weight parts of an organopolysiloxane that contains at least 1 fluorinated organic group and at least 2 alkenyl groups in each molecule;

(B) 0.3 to 40 weight parts of an organohydrogenpolysiloxane that contains at least 2 silicon-bonded hydrogen atoms in each molecule;

(C) 0.1 to 20 weight parts of a fluorine-containing acrylic polymer;

(D) a catalytic quantity of a hydrosilylation catalyst; and (E) an organic solvent The present invention has been disclosed in Japanese Patent Application Number Hei 5-321024, the full disclosure of which is hereby incorporated by reference.

DETAILED DESCRIPTION OF THE INVENTION

The organopolysiloxane comprising component (A) is the base component of the composition of the present invention. Each molecule of this organopolysiloxane must contain at least 1 fluorinated organic group and at least 2 alkenyl groups. They fluorinated organic group is exemplified by groups with the general formula $C_nF_{2n+1}-R-$, wherein n is 1 to 20, R denotes an alkylene group, such as methylene, ethylene, propylene, butylene, and so forth; groups with the general formula $C_nF_{2n+1}-R-O-R-$, in which n and R are defined as above; and groups with the general formula

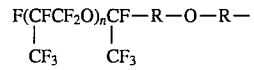

wherein n and R are defined as above.

The alkenyl group of component (A) is exemplified by groups with the general formula $CH_2=CH-(CH_2)_a-$, in which a is an integer of 0 to 10. Any organopolysiloxane whose molecular chain carries the above-specified organic groups may be used as organopolysiloxane (A). The molecular structure of this organopolysiloxane is also not critical, and its structure may be linear, branched, or partially crosslinked.

The degree of polymerization (DP) of organopolysiloxane (A) is not critical; however, the viscosity (25° C.) should fall within the range of 100 to 1,000,000 centistokes based on a consideration of the capacity to form a cured release coating.

The other silicon-bonded organic groups in organopolysiloxane (A) are exemplified by substituted and unsubstituted monovalent hydrocarbon groups, for example, alkyl groups such as methyl, ethyl, propyl, and butyl; aryl groups such as phenyl, tolyl, and xylyl; substituted alkyl groups such as 2-phenylethyl and 2-phenylpropyl. Methyl preferably makes up at least 70 mole % of these groups based on a consideration of the release properties. In addition, organopolysiloxane (A) may contain small quantities of hydroxyl and alkoxy groups.

Component (A) is specifically, but nonexhaustively, exemplified by dimethylvinylsiloxy-endblocked methyl(3,3,3-trifluoropropyl)siloxane-methylvinylsiloxane copolymers, dimethylvinylsiloxy-endblocked methyl(3,3,3-trifluoropropyl)siloxane-dimethylsiloxane-methylvinylsiloxane copolymers, dimethylvinylsiloxy-endblocked methyl(3,3,3-trifluoropropyl)siloxane-methyl(perfluorobutylethyl)siloxane-methylvinylsiloxane copolymers, dimethylvinylsiloxy-endblocked methyl(perfluorobutylethyl)siloxane-dimethylsiloxane-methylvinyl siloxane copolymers, dimethylvinylsiloxy-endblocked methyl(perfluorohexylethyl)siloxane-dimethylsiloxane-methylvinyl siloxane copolymers, trimethylsiloxy-endblocked methyl(perfluorobutylethyl)siloxane-dimethylsiloxane-methylvinyl siloxane copolymers, trimethylsiloxy-endblocked methyl(perfluorohexylethyl)siloxane-dimethylsiloxane-methylvinyl siloxane copolymers, dimethylvinylsiloxy-endblocked methyl(perfluorobutylethyl)siloxane-dimethylsiloxane copolymers, silanol-endblocked methyl(perfluorobutylethyl)siloxane-dimethylsiloxane-methylvinyl siloxane copolymers, and dimethylhexenylsiloxy-endblocked methyl(perfluorobutylethyl)siloxane-dimethylsiloxane-methylhexenylsiloxane copolymers.

The organohydrogenpolysiloxane comprising the component (B) used in the present invention is a crosslinker for component (A) and must contain at least 2 silicon-bonded hydrogens in each molecule in order to function in this capacity. Organohydrogenpolysiloxane (B) is specifically, but nonexhaustively exemplified by trimethylsiloxy-endblocked dimethylsiloxane-methylhydrogensiloxane copolymers, dimethylhydrogensiloxy-endblocked methyl(perfluorobutylethyl)siloxane-methylhydrogensiloxane copolymers, trimethylsiloxy-endblocked methyl(perfluorobutylethyl)siloxane-dimethylsiloxane-methylhydrogensiloxane copolymers, trimethylsiloxy-endblocked methyl(perfluorohexylethyl)siloxane-methylhydrogensiloxane copolymers, and copolymers composed of the methyl(perfluorobutylethyl)siloxane, dimethylhydrogensiloxane, and $SiO_2$ units.

Component (B) is added at 0.3 to 40 weight parts per 100 weight parts of component (A). The coating has a slow cure rate at an addition below 0.3 weight parts per 100 weight parts component (A), while the release performance of the cured coating declines at additions in excess of 40 weight parts.

The fluorine-containing acrylic polymer comprising component (C) is the component that characterizes the present invention, and it is the crucial component for imparting release properties to the cured film afforded by the invention composition. This fluorine-containing acrylic polymer comprises the polymers obtained from an acrylic monomer with general formula (a)

$$CH_2=CX-COOR' \qquad (a)$$

in which X is hydrogen or methyl and R' denotes a $C_4$ to $C_{15}$ monovalent hydrocarbon group that contain the —$CF_2$— bond. Since X in the acrylic monomer with general formula (a) can be hydrogen or methyl, this acrylic monomer will be an acrylate ester or methacrylate ester.

R' denotes a monovalent hydrocarbon group that contains the —$CF_2$— bond, and has from 4 to 15 carbon atoms. It is exemplified by the following structures:
—$CH_2(CF_2)_4F$,
—$CH_2(CF_2)_4H$,
—$CH_2CH_2(CF_2)_4F$,
—$CH_2CH_2(CF_2)_4H$,
—$CH_2(CF_2)_6F$,
—$CH_2(CF_2)_8H$,
—$CH_2CH_2(CF_2)_8F$, and
—$CH_2CH_2(CF_2)_6H$.

Acrylic monomer (a) may be polymerized by a free-radical reaction in the presence of an initiator. The initiator (radical source) used here is not critical and is exemplified by organoperoxides such as dicumyl peroxide, di(tert-butyl) peroxide, benzoyl peroxide, cumene hydroperoxide, and so forth, and by azo compounds such as azobisisobutyronitrile, azobisisobutyrate esters, azodibenzoyl, tetramethyltetrazene, and so forth. The use of azo compounds is preferred. This polymerization may involve only a single acrylic monomer with general formula (a) or the mixture of two or more such monomers.

This polymerization reaction can be run with or without solvent. The use of solvent is safer and more reliable since it facilitates control of the reaction. Suitable solvents are exemplified by aromatic solvents such as benzene, toluene, and xylene; aliphatic solvents, such as hexane and heptane; ethers, such as tetrahydrofuran and diethyl ether; alcohols, such as methanol, ethanol, propanol, and butanol; ketones, such as acetone, methyl ethyl ketone, and methyl isobutyl ketone; esters, such as ethyl acetate and butyl acetate; chlorinated hydrocarbons, such as carbon tetrachloride, trichloroethane, and chloroform; fluorinated aromatic hydrocarbons, such as trifluoromethylbenzene, 1,3-bis(trifluoromethyl)benzene, and methylpentafluorobenzene; dimethylformamide; and dimethyl sulfoxide. Ketones and esters are preferred. The preceding solvents may also be used in combinations of two or more.

This polymerization reaction is run at a temperature at which the initiator is decomposed and is run until monomer conversion reaches a set or desired value. This reaction may be run at elevated, reduced, or ambient pressure, and it will be desirable to monitor monomer conversion, for example, by gas chromatography. Since monomer conversion is strongly dependent on the particular reaction conditions, such as the type of initiator, type of solvent, monomer concentration, etc., the optimal conditions must typically be determined by experiment.

Fluorine-containing acrylic polymers encompassed by component (C) are specifically exemplified by the following (in which p is a positive number and Me is methyl):
{—$CH_2$—$CH(COOCH_2(CF_2)_4F)$—}$_p$,
{—$CH_2$—$CMe(COOCH_2(CF_2)_4H)$—}$_p$,
{—$CH_2$—$CMe(COOCH_2CH_2(CF_2)_4H)$—}$_p$,
{—$CH_2$—$CH(COOCH_2CH_2(CF_2)_4F)$—}$_p$,
{—$CH_2$—$CH(COOCH_2CH_2(CF_2)_6F)$—}$_p$,
{—$CH_2$—$CMe(COOCH_2(CF_2)_8H)$—}$_p$,
{—$CH_2$—$CMe(COOCH_2CH_2(CF_2)_8F)$—}$_p$, and
{—$CH_2$—$CH(COOCH_2CH_2(CF_2)_6H)$—}$_p$.

These fluorine-containing acrylic polymers range in character from low-DP oils to high-DP solids, but preferred for use in the invention are fluorine-containing acrylic polymers that have a pour point in the range of 0° C. to 200° C. and a degree of polymerization corresponding to an average molecular weight of 900 to 200,000.

The general range for component (C) addition is 0.1 to 20 weight parts per 100 weight parts component (A), while its preferred range of addition is 1 to 10 weight parts per 100 weight parts component (A).

Component (D) is a hydrosilylation catalyst which functions as a catalyst of the crosslinking reaction between organopolysiloxane (A) and organohydrogenpolysiloxane (B). No specific restrictions apply to this hydrosilylation catalyst, and it is specifically exemplified by very finely divided platinum adsorbed on a carbon powder carrier, chloroplatinic acid, alcohol-modified chloroplatinic acid, olefin complexes of chloroplatinic acid, chloroplatinic acid/vinylsiloxane coordination compounds, platinum black, palladium catalysts, and rhodium catalysts. Component (D) should be added in a catalytic quantity to the invention composition, typically 0.1 to 500 parts per million (ppm) by weight of the metal in the total composition.

The organic solvent comprising component (E) is necessary for the purposes of improving the storage stability of the composition of the invention and for improving its coatability (i.e., ease of application) on various substrates. Organic solvents that can dissolve the invention composition to homogeneity may be used as component (E), and such organic solvents are exemplified by fluorinated aromatic hydrocarbons, such as trifluoromethylbenzene, 1,3-bis(trifluoromethyl)benzene, and methylpentafluorobenzene; aromatic hydrocarbons, such as benzene, toluene, and xylene; aliphatic hydrocarbons, such as heptane, hexane, pentane, and isooctane; ketones, such as acetone, methyl ethyl ketone, and methyl isobutyl ketone; esters, such as ethyl acetate and butyl acetate; ethers, such as tetrahydrofuran and diethyl ether; alcohols, such as methanol, ethanol, propanol, and butanol; dimethylformamide; and dimethyl sulfoxide. Ketones and esters are preferred. The preceding organic solvents may also be used in combinations of two or more. The amount of solvent (E) to be used is not critical and can be determined by routine experimentation. Typically, at least one part by weight of (E) is used for 100 parts of (A), preferably 100 to 1000 parts of (E) per 100 pats of (A).

The composition according to the invention consists of components (A) to (E) as described above, but small amounts of a component (F), comprising an inhibitor for the hydrosilylation catalyst (D), may be added on an optional basis for the purpose of improving the composition's room-temperature storage stability. Component (F) is exemplified by alkynyl alcohols, such as 3-methyl-1-butyn-3-ol, 3,5-dimethyl-1-hexyn-3-ol, and 3-methyl-1-pentyn-3-ol, phenylbutynol; 3-methyl-3-penten-1-yne; 3,5-dimethyl-1-hexyn-3-ene; cyclotetra(methylvinylsiloxane); and benzotriazole, inter alia.

The composition according to the present invention is readily prepared simply by mixing components (A) to (E) or components (A) to (F) to homogeneity. An advantageous mixing method consists of first homogeneously dissolving components (A) and (C) in component (E) and then mixing in components (B) and (D).

Various additives may also be added to the composition of the present invention insofar as the object of the invention is not impaired. These additives are exemplified by inorganic fillers, such as fumed silica, silica whose surface has been rendered hydrophobic by treatment with various silylating agents or silane treatment agents, precipitated silica, fused silica, quartz powder, silica gel, silica balloons, carbon black, mica, talc, calcium carbonate, glass fiber, iron oxide, titanium oxide, alumina, aluminum hydroxide, and diatomaceous earth; oils such as silicone oils, mineral oils, and hydrocarbon oils; dyes, coloring pigments; oxidation inhibitors; heat stabilizers; and flame retardants.

When coated on the surface of a substrate, such as paper, plastic films, or fabrics, and then heated at 120° C. to 150° C. for 20 seconds to 30 minutes, the composition of the present invention forms a cured coating that adheres to the particular substrate and at the same time exhibits very stable release properties with respect to tacky substances, for example, pressure-sensitive adhesives and the like.

EXAMPLES

The invention is explained in greater detail below through working examples. In the examples, "parts" indicates "weight parts", Me is an abbreviation for methyl, and the values reported for the viscosity were measured at 25° C.

The property values reported in the examples were measured as follows.

Measurement of the Curability

The organopolysiloxane composition was coated in the specified amount on the surface of the film or sheet substrate and heated in a forced convection oven at the specified temperature. The time required for the formation of the completely cured film was measured.

Measurement of the Release Resistance

The organopolysiloxane composition was coated in the specified amount on the surface of the film or sheet substrate, and a cured coating was produced by heating in a forced convection oven at the specified temperature for the specified period of time. A silicone resin-based pressure-sensitive adhesive (brand name: SD4580™, from Dow Corning Toray Silicone Company, Limited, Japan; adhesive strength to stainless steel panel=1400 g/inch) was applied to the surface of the cured coating followed by heating for 2 minutes at 100° C. A polyethylene backing film (brand name: Lumilar S-10™, from Toray Kabushiki Kaisha, Japan) was then applied to the treated surface, and the assembly was aged at 25° C. under a load of 18 g/cm$^2$ for a standard period of time to yield the measurement sample. The measurement sample was cut to a width of 2.5 cm to yield the test specimen. Using a tensile tester, the force (g) that was required to peel the backing film at 180° at a peel rate of 0.3 m/minute was measured.

Measurement of the Residual Adhesion

After measurement of the release resistance as above, the test specimen was applied to a stainless steel panel, and the force (g) required to peel the test specimen at 180° from the stainless steel panel at a peel rate of 0.3 m/minute was measured. This force is reported as a percentage of the force required to peel the untreated reference tape.

EXAMPLE 1

The following were dissolved in 700 parts of ethyl acetate: 100 parts of dimethylvinylsiloxy-endblocked methyl(3,3,3-trifluoropropyl)siloxane-methylvinylsiloxane copolymer gum (average DP=7,000) composed of 99 mole % CF$_3$CH$_2$CH$_2$SiMeO units and 1 mole % CH$_2$=CHSiMeO units, 3 parts of trimethylsiloxy-endblocked methyl(perfluorobutylethyl)siloxane-methylhydrogensiloxane copolymer having a viscosity of 20 centipoise, 1 part of cyclotetra(methylvinylsiloxane), and 5 parts of poly(1H,1H,5H-octafluoropentyl methacrylate) which was solid at room temperature, had an average DP of 200, and had the average structural formula {—CH$_2$—CMe(COOCH$_2$(CF$_2$)$_4$H)—}$_{200}$. A curable organopolysiloxane composition was then obtained by the addition of sufficient chloroplatinic acid/divinyltetramethyldisiloxane complex to give 500 ppm platinum metal. acid/divinyltetramethyldisiloxane complex to give 500 ppm platinum metal.

This composition was applied at a rate of 0.3 g/m$^2$ on polyethylene film, and its curability was measured at 120° C. and 140° C. The release resistance and residual adhesion were measured on the cured film prepared by heating for 35 seconds at 150° C. These measurement results are reported in Tables 1 and 2.

COMPARATIVE EXAMPLE 1

For comparison, an organopolysiloxane composition was prepared using the same procedure as above, but in this case omitting the poly(1H,1H,5H-octafluoropentyl methacrylate). The resulting organopolysiloxane composition was measured for its curability, release resistance, and residual adhesion as above, and these measurement results are also reported in Tables 1 and 2.

TABLE 1

|  | curability (seconds) | |
|---|---|---|
|  | 120° C. | 140° C. |
| Example 1 | 30 | 20 |
| Comparative Example 1 | 30 | 20 |

TABLE 2

|  | release resistance (g/2.5 cm) | residual adhesion (%) |
|---|---|---|
| Example 1 | 180 | 98 |

TABLE 2-continued

| | release resistance (g/2.5 cm) | residual adhesion (%) |
|---|---|---|
| Comparative Example 1 | 450 | 96 |

EXAMPLE 2

The following were dissolved in 688.5 parts of methyl isobutyl ketone: 100 parts dimethylvinylsiloxy-endblocked methyl(perfluorobutylethyl)siloxane-methyl(3,3,3-trifluoropropyl)siloxane-methylvinylsiloxane copolymer (viscosity= 500 poise) composed of 50 mole % methyl(perfluorobutylethyl)siloxane units and 1 mole % methylvinylsiloxane units, 4 parts trimethylsiloxy-endblocked methyl(perfluorobutylethyl)siloxane-methylhydrogensiloxane copolymer with a viscosity of 20 centipoise, 0.7 part cyclotetra(methylvinylsiloxane), and 6 parts poly(2-(perfluorohexyl)ethyl acrylate) which was solid at room temperature, had an average DP of 200, and had the average structural formula {—$CH_2$—$CH(COOCH_2CH_2(CF_2)_6F)$—}$_{200}$. A release film-forming organopolysiloxane composition was then obtained by the addition of sufficient chloroplatinic acid/ divinyltetramethyldisiloxane complex to give 500 ppm platinum metal. This composition was coated at a rate of 0.2 g/m$^2$ on the surface of polyethylene film followed by heating at 150° C. for 1 minute. The resulting cured coating was submitted to measurement of the release resistance and residual adhesion, and the obtained measurement results are reported in Table 3.

TABLE 3

| | release resistance (g/2.5 cm) | residual adhesion (%) |
|---|---|---|
| Example 2 | 70 | 98 |

That which is claimed is:

1. A curable organopolysiloxane composition comprising:
   (A) 100 parts by weight of an organopolysiloxane that contains at least one fluorinated organic group and at least two alkenyl groups in each molecule;
   (B) 0.3 to 40 parts by weight of an organohydrogenpolysiloxane that contains at least two silicon-bonded hydrogen atoms in each molecule;
   (C) 0.1 to 20 parts by weight of a fluorine-containing acrylic polymer;
   (D) a catalytic quantity of a hydrosilylation catalyst; and
   (E) a sufficient amount of an organic solvent to impart coatability to said composition.

2. The composition according to claim 1, wherein said fluorine-containing acrylic polymer (C) comprises units having a structure selected from the group consisting of
—$CH_2$—$CH(COOCH_2(CF_2)_4F)$—,
—$CH_2$—$CMe(COOCH_2(CF_2)_4H)$—,
—$CH_2$—$CMe(COOCH_2CH_2(CF_2)_4H)$—,
—$CH_2$—$CH(COOCH_2CH_2(CF_2)_4F)$—,
—$CH_2$—$CH(COOCH_2CH_2(CF_2)_6F)$—,
—$CH_2$—$CMe(COOCH_2(CF_2)_8H)$—,
—$CH_2$—$CMe(COOCH_2CH_2(CF_2)_8F)$—, and
—$CH_2$—$CH(COOCH_2CH_2(CF_2)_6H)$—,
in which Me denotes a methyl radical.

3. The composition according to claim 1, wherein said organopolysiloxane (A) is selected from the group consisting of dimethylvinylsiloxy-endblocked methyl(3,3,3-trifluoropropyl) siloxane-methylvinylsiloxane copolymers, dimethylvinylsiloxy-endblocked methyl(3,3,3-trifluoropropyl) siloxane-dimethylsiloxane-methylvinylsiloxane copolymers, dimethylvinylsiloxy-endblocked methyl(3,3,3-trifluoropropyl) siloxane-methyl(perfluorobutylethyl)siloxane-methylvinylsiloxane copolymers, dimethylvinylsiloxy-endblocked methyl(perfluorobutylethyl) siloxane-dimethylsiloxane-methylvinylsiloxane copolymers, dimethylvinylsiloxy-endblocked methyl(perfluorohexylethyl) siloxane-dimethylsiloxane-methylvinylsiloxane copolymers, trimethylsiloxy-endblocked methyl(perfluorobutylethyl) siloxane-dimethylsiloxane-methylvinylsiloxane copolymers, trimethylsiloxy-endblocked methyl(perfluorohexylethyl) siloxane-dimethylsiloxane-methylvinylsiloxane copolymers, dimethylvinylsiloxy-endblocked methyl(perfluorobutylethyl) siloxane-dimethylsiloxane copolymers, silanol-endblocked methyl(perfluorobutylethyl) siloxane-dimethylsiloxane-methylvinylsiloxane copolymers, and dimethylhexenylsiloxy-endblocked methyl(perfluorobutylethyl) siloxane-dimethylsiloxane-methylhexenylsiloxane copolymers.

4. The composition according to claim 3, wherein said organohydrogenpolysiloxane (B) is selected from the group consisting of trimethylsiloxy-endblocked dimethylsiloxane-methylhydrogensiloxane copolymers, dimethylhydrogensiloxy-endblocked methyl(perfluorobutylethyl) siloxane-methylhydrogensiloxane copolymers, trimethylsiloxy-endblocked methyl(perfluorobutylethyl)siloxane-dimethylsiloxane-methylhydrogensiloxane copolymers, trimethylsiloxy-endblocked methyl(perfluorohexylethyl)siloxane-methylhydrogensiloxane copolymers, and copolymers composed of methyl(perfluorobutylethyl)siloxane, dimethylhydrogensiloxane and $SiO_2$ units.

5. The composition according to claim 4, wherein said fluorine-containing acrylic polymer (C) comprises units having a structure selected from the group consisting of
—$CH_2$—$CH(COOCH_2(CF_2)_4F)$—,
—$CH_2$—$CMe(COOCH_2(CF_2)_4H)$—,
—$CH_2$—$CMe(COOCH_2CH_2(CF_2)_4H)$—,
—$CH_2$—$CH(COOCH_2CH_2(CF_2)_4F)$—,
—$CH_2$—$CH(COOCH_2CH_2(CF_2)_6F)$—,
—$CH_2$—$CMe(COOCH_2(CF_2)_8H)$—,
—$CH_2$—$CMe(COOCH_2CH_2(CF_2)_8F)$—, and
—$CH_2$—$CH(COOCH_2CH_2(CF_2)_6H)$—,
in which Me denotes a methyl radical.

6. The composition according to claim 1, further comprising an inhibitor for said hydrosilylation catalyst (D).

7. The composition according to claim 5, further comprising an inhibitor for said hydrosilylation catalyst (D).

8. The composition according to claim 1, wherein said solvent (E) is selected from the group consisting of acetone, methyl ethyl ketone, methyl isobutyl ketone, ethyl acetate and butyl acetate.

9. The composition according to claim 5, wherein said solvent (E) is selected from the group consisting of acetone, methyl ethyl ketone, methyl isobutyl ketone, ethyl acetate and butyl acetate.

10. A substrate coated with the cured composition according to claim 1.

11. A substrate coated with the cured composition according to claim 2.

12. A substrate coated with the cured composition according to claim 3.

13. A substrate coated with the cured composition according to claim 4.

14. A substrate coated with the cured composition according to claim 5.

15. A curable organopolysiloxane composition comprising:
- (A) 100 parts by weight of an organopolysiloxane that contains at least one fluorinated organic group and at least two alkenyl groups in each molecule;
- (B) 0.3 to 40 parts by weight of an organohydrogenpolysiloxane that contains at least two silicon-bonded hydrogen atoms in each molecule;
- (C) 0.1 to 20 parts by weight of a fluorine-containing acrylic polymer having a main chain structure represented by a formula selected from the group consisting of $\{-CH_2-CH(COOCH_2(CF_2)_4F)-\}_p$,
$\{-CH_2-CMe(COOCH_2(CF_2)_4H)-\}_p$,
$\{-CH_2-CMe(COOCH_2CH_2(CF_2)_4H)-\}_p$,
$\{-CH_2-CH(COOCH_2CH_2(CF_2)_4F)-\}_p$,
$\{-CH_2-CH(COOCH_2CH_2(CF_2)_6F)-\}_p$,
$\{-CH_2-CMe(COOCH_2(CF_2)_8H)-\}_p$,
$\{-CH_2-CMe(COOCH_2CH_2(CF_2)_8F)-\}_p$ and
$\{-CH_2-CH(COOCH_2CH_2(CF_2)_6H)-\}_p$, in which Me denotes a methyl radical and p is a positive number;
- (D) a catalytic quantity of a hydrosilylation catalyst; and
- (E) a sufficient amount of an organic solvent to impart coatability to said composition.

16. The composition according to claim 15, wherein said organopolysiloxane (A) is selected from the group consisting of dimethylvinylsiloxy-endblocked methyl(3,3,3-trifluoropropyl) siloxane-methylvinylsiloxane copolymers, dimethylvinylsiloxy-endblocked methyl(3,3,3-trifluoropropyl) siloxane-dimethylsiloxane-methylvinylsiloxane copolymers, dimethylvinylsiloxy-endblocked methyl(3,3,3-trifluoropropyl) siloxane-methyl(perfluorobutylethyl)siloxane-methylvinylsiloxane copolymers, dimethylvinylsiloxy-endblocked methyl(perfluorobutylethyl) siloxane-dimethylsiloxane-methylvinylsiloxane copolymers, dimethylvinylsiloxy-endblocked methyl(perfluorohexylethyl) siloxane-dimethylsiloxane-methylvinylsiloxane copolymers, trimethylsiloxy-endblocked methyl(perfluorobutylethyl) siloxane-dimethylsiloxane-methylvinylsiloxane copolymers, trimethylsiloxy-endblocked methyl(perfluorohexylethyl) siloxane-dimethylsiloxane-methylvinylsiloxane copolymers, dimethylvinylsiloxy-endblocked methyl(perfluorobutylethyl) siloxane-dimethylsiloxane copolymers, silanol-endblocked methyl(perfluorobutylethyl) siloxane-dimethylsiloxane-methylvinylsiloxane copolymers, and dimethylhexenylsiloxy-endblocked methyl(perfluorobutylethyl) siloxane-dimethylsiloxane-methylhexenylsiloxane copolymers.

17. The composition according to claim 16, wherein said organohydrogenpolysiloxane (B) is selected from the group consisting of trimethylsiloxy-endblocked dimethylsiloxane-methylhydrogensiloxane copolymers, dimethylhydrogensiloxy-endblocked methyl(perfluorobutylethyl) siloxane-methylhydrogensiloxane copolymers, trimethylsiloxy-endblocked methyl(perfluorobutylethyl)siloxane-dimethylsiloxane-methylhydrogensiloxane copolymers, trimethylsiloxy-endblocked methyl(perfluorohexylethyl)siloxane-methylhydrogensiloxane copolymers, and copolymers composed of methyl(perfluorobutylethyl)siloxane, dimethylhydrogensiloxane and $SiO_2$ units.

18. The composition according to claim 15, further comprising a an inhibitor for said hydrosilylation catalyst (D).

19. The composition according to claim 15, wherein solvent (E) is selected from the group consisting of acetone, methyl ethyl ketone, methyl isobutyl ketone, ethyl acetate and butyl acetate.

* * * * *